July 10, 1951     B. SCHROETER     2,560,133
BEARING
Filed Dec. 14, 1944     2 Sheets-Sheet 1
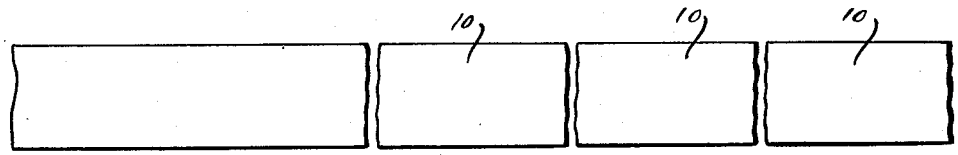
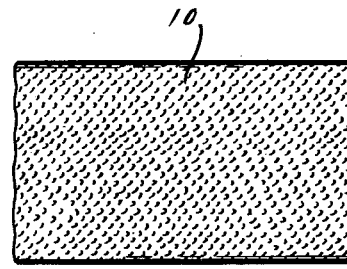 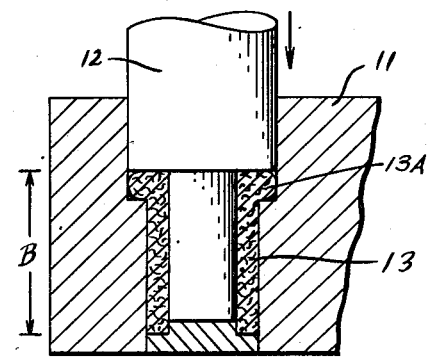
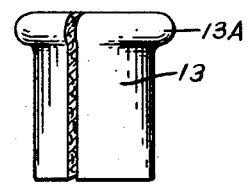 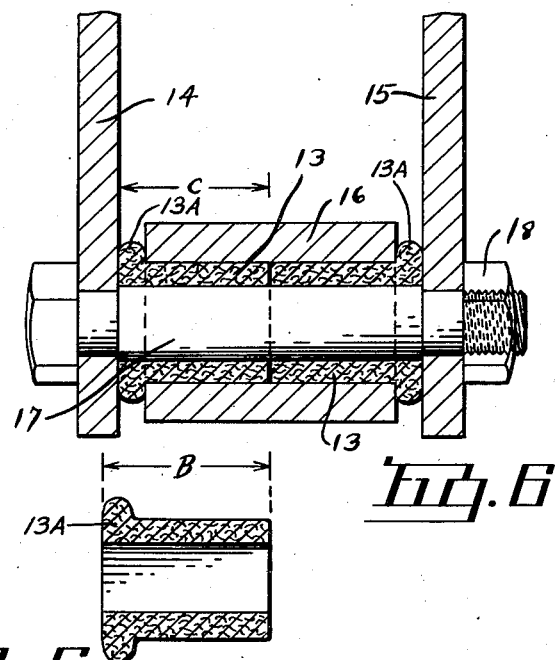
INVENTOR.
BRUNO SCHROETER
BY Barnes, Kisselle, Laughlin & Raisch
Attorneys July 10, 1951  B. SCHROETER  2,560,133
BEARING
Filed Dec. 14, 1944  2 Sheets-Sheet 2

INVENTOR.
BRUNO SCHROETER
BY Barnes, Kisselle Laughlin & Raisch
Attorneys

Patented July 10, 1951

2,560,133

UNITED STATES PATENT OFFICE 2,560,133

BEARING

Bruno Schroeter, Detroit, Mich., assignor to O. & S. Bearing Company, Detroit, Mich., a corporation of Michigan Application December 14, 1944, Serial No. 568,089

3 Claims. (Cl. 308—238)

This invention relates to a bearing.

The invention herein has particularly to do with what is commonly referred to as a self-lubricating bearing, and is the type in which a lubricant-impregnated, compressible-expansible fibrous material is used between metal parts of a bearing to take the wear and furnish the lubrication.

It is an object of the present invention to provide a bearing of simplified construction which cuts down the initial cost of manufacture and any replacement cost.

It is a further object to provide a bearing which withstands end thrust forces without complicated design. It is another object of the invention to provide a method of constructing a bearing bushing which may be used in the bearing design herein disclosed or which may be used to replace worn bushings of other types.

Other objects of the invention having to do with details of construction, as well as the steps in the method, will be brought out in the following description and claims.

In the drawings:

Fig. 1 is a view of a fabric strip showing it cut into short pieces as a step in the method of forming the bearing.

Fig. 2 is a view of the strip used to make the bearing insert.

Fig. 3 illustrates the manner in which the insert is compressed and shaped.

Fig. 4 shows the bearing after it has been treated and shaped.

Fig. 5 is a sectional view of the bearing insert prior to assembly.

Fig. 6 is a view of a completed bearing.

Figure 7:
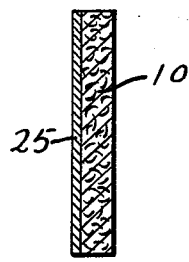
Fig. 7 illustrates a sectional view of a strip having a coating of reinforcing material on one side thereof.

Referring to the drawings, Fig. 1 is intended to represent a strip of fabric material which is used to make the bearing insert of the present invention. The dimensions of this strip will vary with the construction and demands of the bearing. For a normal type of passenger car spring shackle bearing, the short length illustrated in Fig. 2 would have dimensions about as shown with a thickness of approximately one-fourth of an inch.

The first step in the process of manufacture consists of soaking the strips 10 in a lubricating compound of the type described, for example, in copending application, Serial No. 350,344, filed August 3, 1940, now matured into Patent #2,379,478 dated July 3, 1945. The compound used is of such a nature that it is liquid or plastic at from 240° to 260° F. but substantially solidified at room temperatures. An example of the compound to be used is as follows:

| | Per cent by weight |
|---|---|
| Junior red oil | 58.65 |
| Calcium stearate | 16.85 |
| Stearic acid | 20.66 |
| Lamp black | 1.44 |
| Wax (carnauba) | 2.40 |

The fabric is soaked in this heated compound for about four minutes and then fed to a die while still hot. The die is shown diagrammatically in Fig. 3 and consists of a recessed member 11 and a male die member 12. Before being placed in the die, the strip 10 is rolled into an open tube shape 13. When in the die, the material is compressed considerably axially and radially and a flange 13A is formed at one end. The flanges 13A of the tube are also compressed in the die. The next step consists of placing the formed tube in a second die which is heated, although to a temperature less than 240° F. A final compression is then given the tube 13. The dimension A of Fig. 2 is the original width of the strip and, after the two compression steps, the dimension B, shown in Fig. 3, represents the resulting length of the tube. The next step, while not necessary, is desirable. This step consists of dipping the shaped bearing in a hot lubricant to fill the voids caused by the bearing returning somewhat from its compressed shape after removal from the dies. Upon cooling the resulting bearing insert or bushing will maintain its own shape by reason of the cold lubricant and the compression.

The bushings are then ready for assembly into a spring shackle or any other type of bearing. The assembly shown in Fig. 6 is the spring shackle type of suspension which, with parallel arms 14 and 15, support the eye 16 of a spring shackle. In assembly, two bearing inserts 13 are placed end to end in the spring eye. Members 14 and 15 are located at each side thereof and a bolt 17 is passed through the inserts to connect the supporting members 14 and 15. The bolt has a threaded end on which a nut 18 is applied. The nut 18 is screwed up with considerable force to give further compression to the bearing inserts. The dimension B, as shown in Fig. 5, is shortened to the dimension C of Fig. 6. The resulting bearing is one that will withstand all end thrust forces to which it could be subjected. It is one which will expand with wear to perform all the functions of previously designed self-lubricating bearings. In addition, the retaining shell previously thought necessary, is eliminated, corrugating the central pin is no longer necessary, and the preformed insert is still what might be called a compressible and expansible material. If desired, additional radial compression can be obtained by tapering each inner member 17 from the center toward the ends. When the parts are drawn together in assembly, radial compression of the side walls results.

Figure 8:
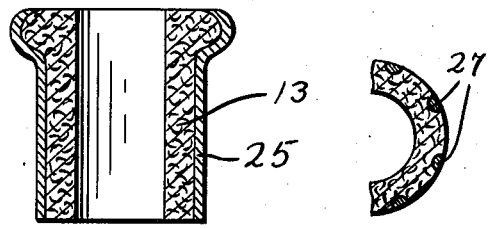
Fig. 8 illustrates a sectional view of a bearing insert having the coating thereon.
Figure 11:
Figs. 9, 10 and 11 illustrate modified ways of accomplishing longitudinal reinforcement with the bearing members.

Modified constructions for the bearing insert are shown in Figs. 7 to 11. In some cases it is desirable to provide a reinforcing coating or other means on the bearing insert to prevent longitudinal expansion after formation. In Fig. 7 a cross section of the strip 10 is shown with a coating 25. In Fig. 8 a bearing 13 is shown with the coating 25. This coating may be a soft metal such as lead or zinc which will compress in the die but is preferably a coating formed of a mixture of hide glue and glycerine. This glue is preferably formed by mixing 8½ pounds of dry glue with 23½ pounds of water and soaking over night. The resulting mixture is then brought to 140° or 150° F. and mixed with glycerine in proportions of ¾ glue and ¼ glycerine. This final mixture is steam cooked and applied when hot by brushing or by a roller. The strips are then soaked in oil or a lubricating compound as previously described and then rolled into the die of a punch press. In two operations the material is then compressed to the shape shown in Fig. 8. The first compression is about one-half the final, and the second one completes the job. The core of the die is kept heated. During this compression the pressure and the heat cause the coating to flow and it will set up immediately when removed from the die, thereby holding the insert thus formed from axial expansion. The bearing may then be re-dipped in lubricating compound to fill the voids.

Figure 9:
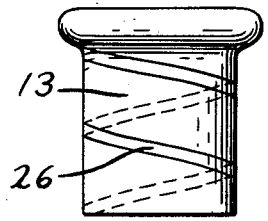
Figure 10:
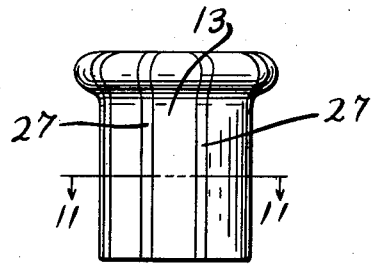

Other modifications for accomplishing this result are shown in Figs. 9 and 10. In Fig. 9 a strip of metal 26 is shown spirally embedded in the outer surface of the bearing insert 13. In Fig. 10 strips of metal 27 are arranged longitudinally on the cylindrical surface and embedded therein. The metal is preferably a soft metal which will compress in the die and still exert force enough when the bearing is completed to prevent any longitudinal expansion.

Figure 12:
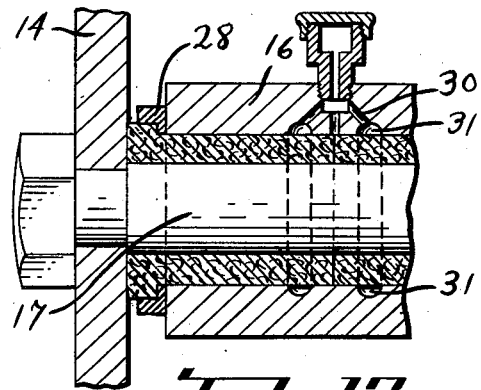
Fig. 12 illustrates a sectional view of a reinforcing ring for the flanged portion of the bearing.
Figure 13:
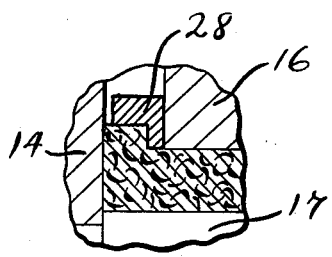
Fig. 13 is an enlarged sectional view showing the reinforcing flange.

For certain applications, a ring of steel 28, shown in Fig. 12, is placed around the shoulder of the bearing insert to bear against the edge of the spring shackle eye 16, enlarged view shown in Fig. 13. This furnishes additional resistance to end thrust and prevents cutting of the bearing.

Figure 14:
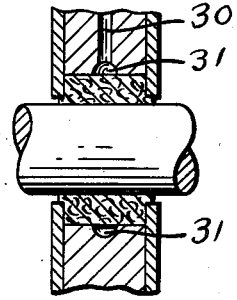
Fig. 14 is a sectional diagrammatic view of a bearing to be used for a rotating shaft.

If the bearing is to be adapted to support a continuously rotating shaft, a source of oil supply may be provided as shown in Figs. 12 and 14. Oil will feed through the fibrous material to the wear surface even when the material has been treated with the reinforcing glue or other substance. Oil passages 30 are shown leading to annular passages 31.

I claim:
1. A bearing comprising an inner member, an outer member, means comprising split fabric tubes formed under great pressure and arranged in axially abutting relation under pressure between said members, supporting means for said inner member, radial flanges at the outer ends of said tubes positioned under compression between said outer member and said supporting means of said inner member, and ring means surrounding the inner edge of said radial flanges at the point of contact with said outer member to reinforce said flange.

2. A bearing comprising a cylindrical inner bearing member, an outer bearing member having a cylindrical hole larger in diameter than the inner bearing member, the overall length of the outer member being less than the inner member, supporting means eyed to receive the ends of the inner member and having portions to overlie the annular space between said inner and outer members, and a woven fabric tube impregnated with lubricating compound positioned around said inner member within said outer member and dimensioned prior to assembly to overall length substantially greater than the distance between said supporting members in final assembly, whereby upon assembly the fabric tube lies compressed axially and radially between the overlying portions of the supporting members.

3. A bearing comprising a cylindrical inner bearing member, an outer bearing member having a cylindrical hole larger in diameter than the inner bearing member, the overall length of the outer member being less than the inner member, supporting means eyed to receive the ends of the inner member and having portions to overlie the annular space between said inner and outer members, and a fabric tube impregnated with lubricating compound positioned around said inner member within said outer member and dimensioned prior to assembly to overall length substantially greater than the distance between said supporting members in final assembly, and integral flanges formed on each end of said tube to lie between the ends of the outer member and the supporting members of the inner member, whereby upon assembly the fabric tube lies compressed axially and radially between the overlying portions of the supporting members.

BRUNO SCHROETER.

REFERENCES CITED

The following references are of record in the file of this patent:

UNITED STATES PATENTS

| Number | Name | Date |
| --- | --- | --- |
| 30,128 | Devlan | Sept. 25, 1860 |
| 270,857 | Storm | Jan. 16, 1883 |
| 338,358 | Pratt | Mar. 23, 1886 |
| 434,016 | Devlan | Aug. 12, 1890 |
| 839,429 | Shook et al. | Dec. 25, 1906 |
| 966,873 | Towne | Aug. 9, 1910 |
| 1,829,574 | Skillman | Oct. 27, 1931 |
| 1,936,863 | Skillman | Nov. 28, 1933 |
| 1,991,491 | Calkins | Feb. 19, 1935 |
| 2,276,349 | Scully | Mar. 17, 1942 |
| 2,379,478 | Delp | July 3, 1945 |